(12) United States Patent  (10) Patent No.: US 8,607,464 B2
Scott et al.  (45) Date of Patent: Dec. 17, 2013

(54) HAND SAW

(75) Inventors: John S. Scott, Brookfield, WI (US); Michael Naughton, Dousman, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

(21) Appl. No.: 13/584,513

(22) Filed: Aug. 13, 2012

(65) Prior Publication Data

US 2012/0324745 A1  Dec. 27, 2012

Related U.S. Application Data

(62) Division of application No. 12/820,277, filed on Jun. 22, 2010, now Pat. No. 8,261,456.

(60) Provisional application No. 61/219,619, filed on Jun. 23, 2009.

(51) Int. Cl.
*B23D 51/01* (2006.01)
*B23D 51/10* (2006.01)

(52) U.S. Cl.
USPC ............................................. 30/517; 30/166.3

(58) Field of Classification Search
USPC .................... 30/166.3, 329, 337, 339, 517
See application file for complete search history.

(56) References Cited

U.S. PATENT DOCUMENTS

| 2,599,407 | A | * | 6/1952 | Miller ............................. 30/335 |
| 4,248,284 | A | | 2/1981 | Tomosada |
| 4,807,363 | A | | 2/1989 | Clifton, Jr. |
| 5,016,512 | A | | 5/1991 | Huang |
| 5,249,362 | A | | 10/1993 | Harding |
| 5,272,948 | A | | 12/1993 | Theising |
| 5,421,091 | A | | 6/1995 | Gerritsen, Jr. |
| 5,443,276 | A | | 8/1995 | Nasser et al. |
| 5,473,820 | A | | 12/1995 | Neubert et al. |
| 5,495,670 | A | | 3/1996 | Quinn |
| 5,722,168 | A | | 3/1998 | Huang |
| 5,848,474 | A | | 12/1998 | Fortney et al. |
| 5,896,799 | A | | 4/1999 | Chen |

(Continued)

FOREIGN PATENT DOCUMENTS

DE    240786    11/1911
EP    0286613    3/1988

OTHER PUBLICATIONS

European Search Report and Written Opinion for Application No. 10251127.6, dated Oct. 15, 2010, (8 pages).

*Primary Examiner* — Hwei C Payer
(74) *Attorney, Agent, or Firm* — Michael Best & Friedrich LLP

(57) ABSTRACT

A hand saw that includes a saw blade and a handle assembly having a clamp member movable between a clamped position and a released position. In the clamped position the clamp member exerts a clamping force on a top edge of the saw blade within a slot of the handle assembly to couple the saw blade to the handle assembly and to retain a tang of the saw blade within the slot. In the released position the tang is removable from the slot. A first interior wall and a second interior wall of the handle assembly that define the slot are flat such that the tang of the saw blade can be removed from the slot without moving the saw blade in a direction normal to a longitudinal axis of the saw blade when the clamp member is in the released position.

21 Claims, 6 Drawing Sheets

(56) References Cited

U.S. PATENT DOCUMENTS

| | | |
|---|---|---|
| 5,924,209 A | 7/1999 | Ward |
| 5,930,902 A | 8/1999 | Hsu |
| 6,113,618 A | 9/2000 | Nic |
| 6,185,826 B1 | 2/2001 | Lutz et al. |
| 6,237,228 B1 | 5/2001 | Moody |
| 6,249,975 B1 | 6/2001 | Lin |
| 6,272,757 B1 | 8/2001 | Roe |
| 6,516,525 B2 | 2/2003 | Liu |
| 6,553,674 B1 | 4/2003 | Budrow |
| 6,578,268 B2 | 6/2003 | Hawketts |
| 6,619,174 B1 | 9/2003 | Chiang |
| 6,711,825 B2 | 3/2004 | Chen |
| 6,722,247 B2 | 4/2004 | Abel |
| 6,848,186 B1 | 2/2005 | Chen et al. |
| 6,893,026 B2 | 5/2005 | Yoshimura et al. |
| 7,065,885 B1 | 6/2006 | Chen |
| 7,096,589 B2 | 8/2006 | Phillips et al. |
| 7,178,244 B2 | 2/2007 | Fossella |
| 7,325,314 B1 | 2/2008 | Chen |
| 7,451,546 B2 | 11/2008 | Delfini et al. |
| 7,497,860 B2 | 3/2009 | Carusillo et al. |
| 7,516,554 B2 | 4/2009 | Ping |
| 8,261,456 B2 * | 9/2012 | Scott et al. ............ 30/517 |
| 8,312,632 B2 * | 11/2012 | Rowlay et al. ......... 30/329 |
| 2003/0084575 A1 | 5/2003 | Chen |
| 2004/0168328 A1 | 9/2004 | Thomas et al. |
| 2007/0101589 A1 | 5/2007 | Wen |
| 2007/0101590 A1 | 5/2007 | Ping |
| 2007/0151112 A1 | 7/2007 | Rakaczki |
| 2007/0204472 A1 * | 9/2007 | Circosta et al. ........ 30/513 |
| 2007/0220758 A1 | 9/2007 | Ho |
| 2008/0276470 A1 | 11/2008 | Ritter et al. |
| 2009/0049700 A1 | 2/2009 | Frankl |
| 2010/0018065 A1 | 1/2010 | Janssson et al. |
| 2010/0031512 A1 | 2/2010 | Rowlay et al. |
| 2010/0319201 A1 | 12/2010 | Scott et al. |

* cited by examiner

HAND SAW

CROSS REFERENCE TO RELATED APPLICATION

This application is divisional application of U.S. patent application Ser. No. 12/820,277, filed Jun. 22, 2010, now U.S. Pat. No. 8,261,456, which claims priority to U.S. Provisional Patent Application 61/219,619, filed Jun. 23, 2009. The entire contents of the applications identified above are hereby incorporated by reference herein.

BACKGROUND

The present invention relates to saws, and more particularly, to hand saws.

Hand saws typically include a handle assembly and a blade that is removably coupled to the handle assembly so that a user can replace the blade if the blade becomes worn or if the user desires to use another type of blade for a different cutting application. Generally, the blade of a hand saw includes a plurality of cutting teeth along a bottom edge of the blade and a tang at an end of the blade. The tang is received within the handle assembly to couple the handle assembly and the blade. Often, an aperture extends through the tang of the blade and the handle assembly includes a fastener that the user extends through the aperture of the tang. To secure the blade to the handle assembly, the user aligns the aperture of the tang with an aperture of the handle assembly and inserts the fastener through the aperture of the tang and the aperture of the handle assembly. A nut or the like can be used with the fastener and the fastener and the nut can be tightened to secure the blade to the handle assembly.

SUMMARY

In one embodiment, the invention provides a hand saw that includes a saw blade having a top edge, a bottom edge having a plurality of cutting teeth, a first sidewall that extends between the top edge and the bottom edge, a second sidewall that extends between the top edge and the bottom edge opposite and generally parallel to the first sidewall, a longitudinal axis between the first sidewall and the second sidewall of the saw blade parallel to the first sidewall and the second sidewall, and a tang located at an end of the saw blade. The tang is at least partially formed by the first sidewall and the second sidewall. The hand saw further includes a handle assembly having a slot that receives the tang to couple the saw blade to the handle assembly. The slot is at least partially defined by a first interior wall of the handle assembly that is parallel to and faces the first sidewall of saw blade when the tang is received in the slot and a second interior wall of the handle assembly that is parallel to and faces the second sidewall of the saw blade when the tang is received in the slot. The handle assembly further includes a handle portion configured to be grasped by a user to reciprocate the saw blade to cut a work piece, and a clamp member movable between a clamped position and a released position. In the clamped position the clamp member exerts a clamping force on the top edge of the saw blade within the slot to couple the saw blade to the handle assembly and to retain the tang within the slot. In the released position the tang is removable from the slot. The first interior wall and the second interior wall of the handle assembly are flat such that the tang of the saw blade can be removed from the slot without moving the saw blade in a direction normal to the longitudinal axis of the saw blade when the clamp member is in the released position.

In another embodiment the invention provides a hand saw including a saw blade having a top edge, a bottom edge having a plurality of cutting teeth, a first sidewall that extends between the top edge and the bottom edge, a second sidewall that extends between the top edge and the bottom edge opposite and generally parallel to the first sidewall, a longitudinal axis between the first sidewall and the second sidewall of the saw blade parallel to the first sidewall and the second sidewall, and a tang located at an end of the saw blade. The tang is at least partially formed by the first sidewall and the second sidewall. The hand saw further includes a handle assembly having a slot that receives the tang to couple the saw blade to the handle assembly, a handle portion configured to be grasped by a user to reciprocate the saw blade to cut a work piece, and a clamp member movable between a clamped position and a released position. In the clamped position the clamp member exerts a clamping force on the top edge of the saw blade within the slot to couple the saw blade to the handle assembly and to retain the tang of the saw blade within the slot. In the released position the tang is removable from the slot, and no portion of the handle assembly extends through the tang from the first sidewall to the second sidewall between the top edge and the bottom edge of the saw blade to inhibit removal of the tang from the slot of the handle assembly when the clamp member is in the clamped position and the released position.

In another embodiment the invention provides a hand saw that includes a saw blade having a top edge, a bottom edge having a plurality of cutting teeth, a first sidewall that extends between the top edge and the bottom edge, a second sidewall that extends between the top edge and the bottom edge opposite and generally parallel to the first sidewall, a longitudinal axis between the first sidewall and the second sidewall of the saw blade parallel to the first sidewall and the second sidewall, and a tang located at an end of the saw blade. The tang is at least partially formed by the first sidewall and the second sidewall. The hand saw further includes handle assembly having a slot that receives the tang to couple the saw blade to the handle assembly. The handle assembly further includes a handle portion configured to be grasped by a user to reciprocate the saw blade to cut a work piece, a clamp member that pivots between a clamped position and a released position, and an actuator that is manually operable between a first position and a second position to move the clamp member from the clamped position to the released position. In the clamped position the clamp member exerts a clamping force on the tang to inhibit removal of the tang from the slot and in the released position the tang can be removed from the slot by pulling the saw blade out of the slot. Insertion of the saw blade into the slot causes the saw blade to contact the clamp member to pivot the clamp member toward the released position allowing a user to insert the saw blade into the slot without the user directly operating the actuator. When the actuator is in the first position, the tang is positioned within the slot, and the clamp is in the clamped position, a force along the longitudinal axis of the saw blade in a direction to remove the tang from the slot causes the clamp member to pivot toward the clamped position to increase the clamping force.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
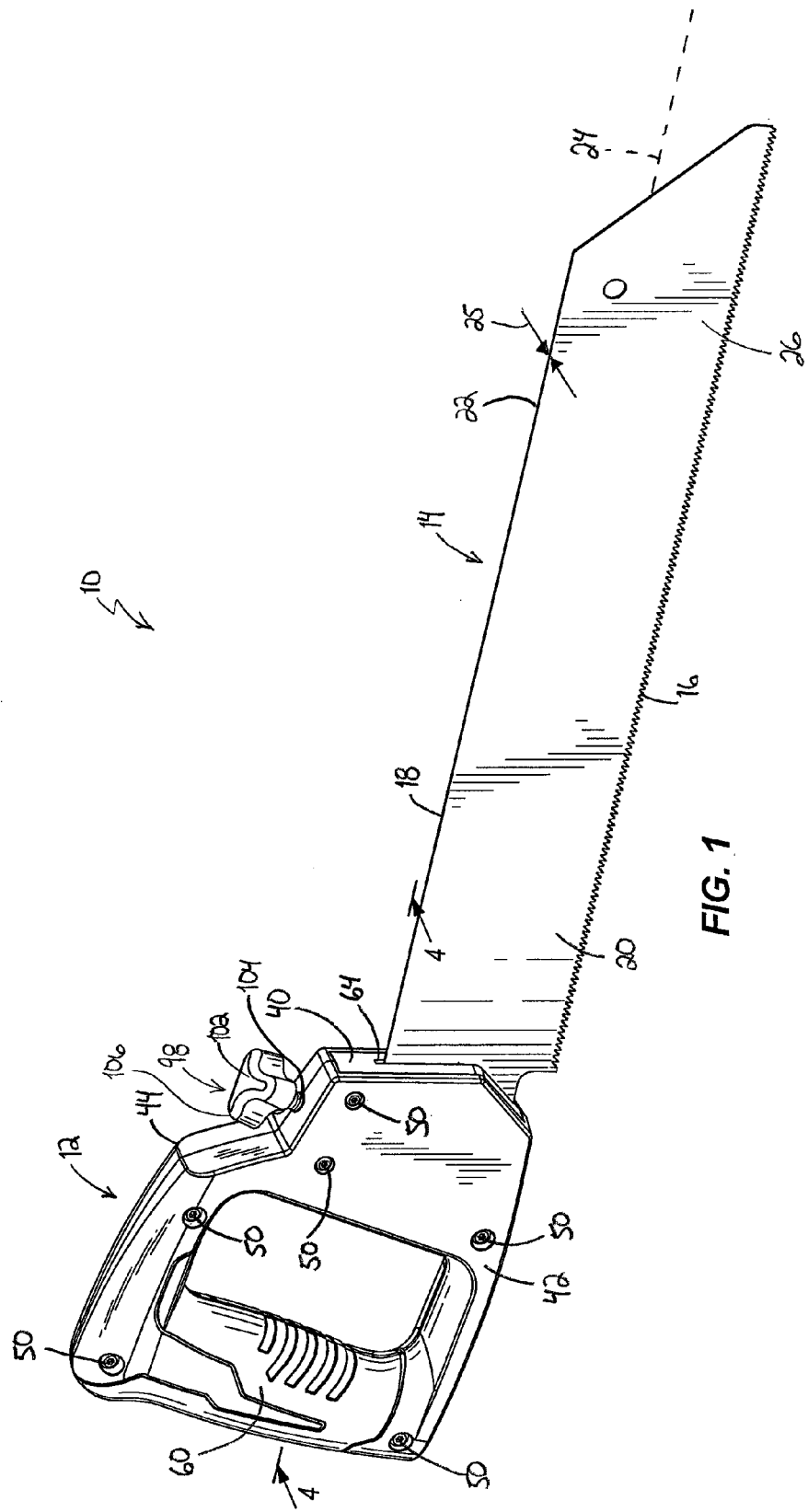
FIG. 1 is a perspective view of a hand saw according to one construction of the invention.

FIG. 1 illustrates a hand saw 10 that includes a handle assembly 12 and a blade 14. The illustrated hand saw 10 is particularly suited for cutting materials such as polyvinyl chloride (PVC) or acrylonitrile butadiene styrene (ABS), which are materials often used to make pipes. The saw 10 may be used to cut other suitable materials, such as wood.

Figure 2:
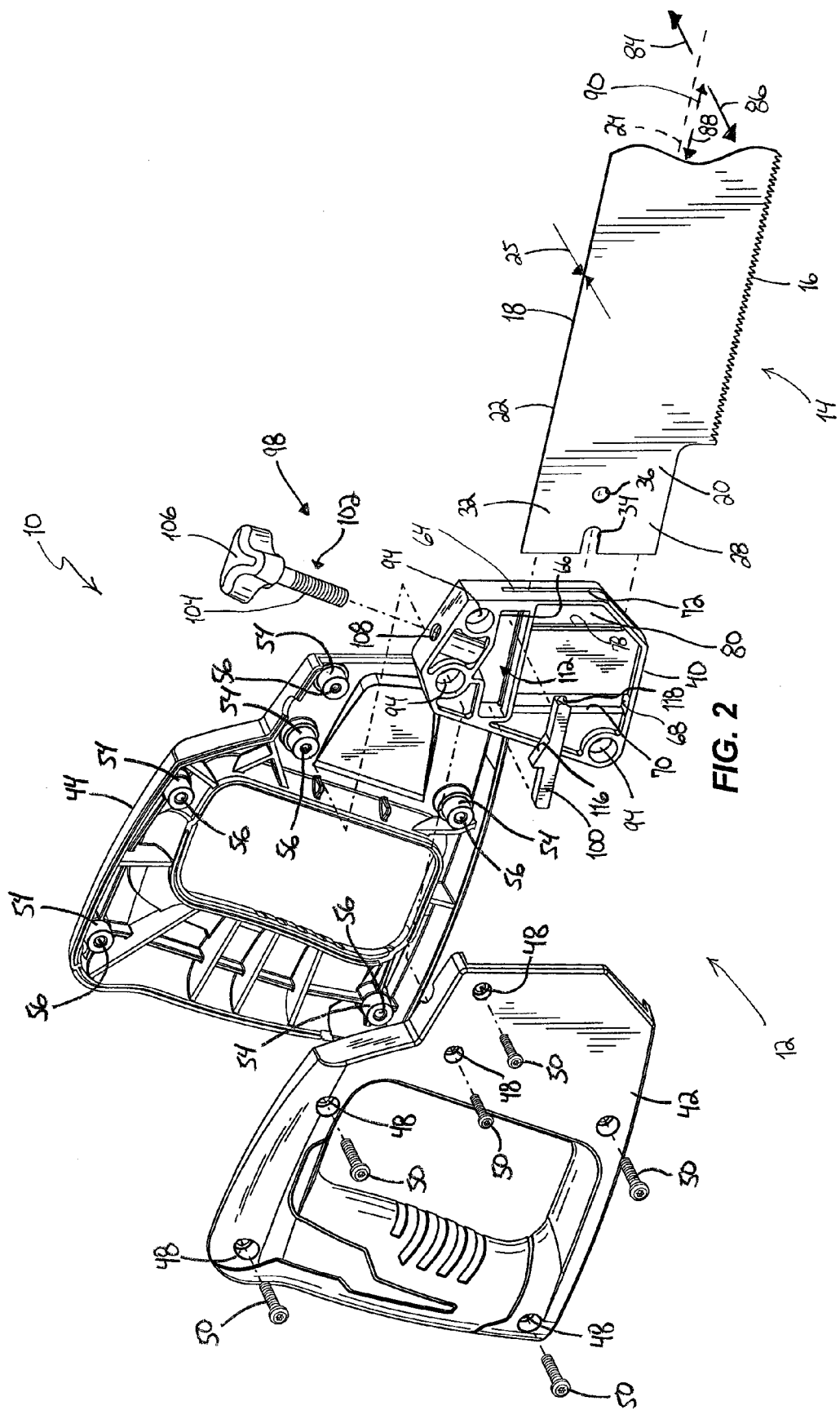
FIG. 2 is an exploded view of the hand saw of FIG. 1.
Figure 3:
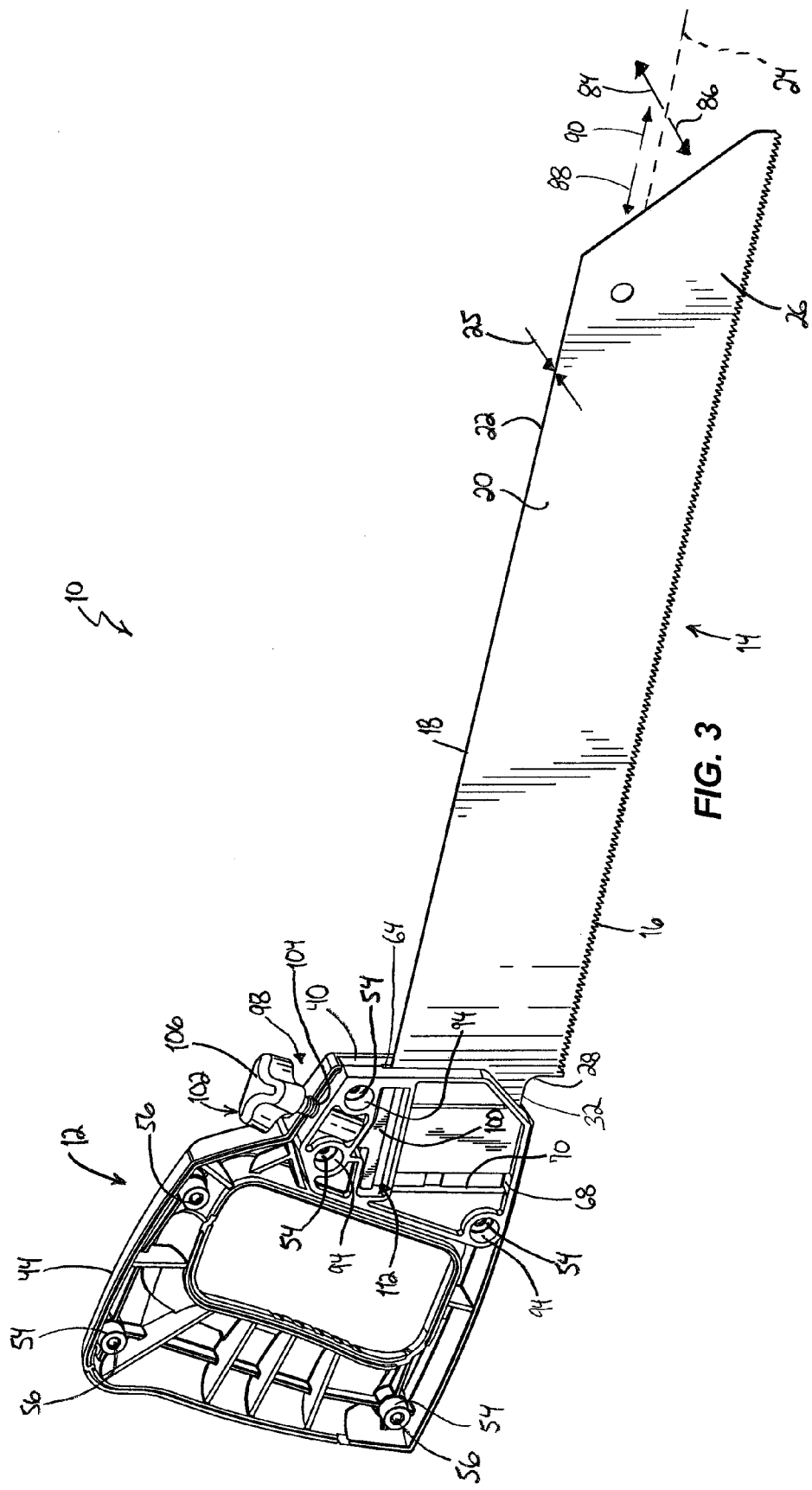
FIG. 3 is a perspective view of the hand saw of FIG. 1 with a handle member removed.

The blade 14 includes a bottom or cutting edge 16 having a plurality of cutting teeth, a top edge 18 that is opposite the cutting edge 16, a first sidewall 20 that extends between the top edge 18 and the cutting edge 16, and a second sidewall 22 that extends between the top edge 18 and the cutting edge 16 parallel to the first sidewall 20 but on the opposite side of the blade 14 from the first sidewall 20. A longitudinal axis 24 extends along the length of the blade 14 between the sidewalls 20, 22 as illustrated in FIG. 2. In the illustrated construction, the sidewalls 20, 22 are flat and the sidewalls 20, 22 are parallel to each other such that the longitudinal axis 24 is parallel to the sidewalls 20, 22. A thickness 25 of the blade is defined as the distance from the first sidewall 20 to the second sidewall 22 perpendicular to the longitudinal axis 24, as illustrated in FIG. 1. Referring to FIGS. 2 and 3, the blade 14 further includes a front end portion 26 and a rear end portion 28. A tang 32 is formed at the rear end portion 28 of the blade 14. As best seen in FIG. 2, the tang 32 includes a U-shaped aperture 34 and a circular aperture 36 that is positioned forward of the U-shaped aperture 36 or closer to the front end portion 26 of the blade 14 than the U-shaped aperture 34. In one construction, the blade 14 is an 18 inch (length) by 2.5 inch (height) by 0.035 inch (thickness) blade having 10 teeth per inch in a raker pattern. In such a construction, the blade 14 is formed from high carbon steel with hardened or bimetal teeth. In other constructions, other types and sizes of blades may be utilized.

Referring to FIGS. 1 and 2, the handle assembly 12 includes a main body 40, a first handle member 42, and a second handle member 44. In the illustrated construction, the first handle member 42 and the second handle member 44 each form half of an outer cover or shell around the main body 40, and the main body 40 is located within or between the handle members 42, 44. The illustrated first handle member 42 includes apertures 48 that each receives a fastener 50 to couple the handle members 42, 44. The second handle member 44 includes posts 54 that each include a threaded blind bore 56. Each threaded bore 56 of the second handle member 44 aligns with one of the apertures 48 of the first handle member 42 such that each pair of aligned apertures 48 and bores 56 receives one of the fasteners 50 to couple the members 42, 44 to the main body 40. As illustrated in FIG. 1, when the handle members 42, 44 are coupled, the handle members 42, 44 together define a handle portion 60 of the saw 10. The handle portion 60 is grabbed by a user to reciprocate the blade 14 along the longitudinal axis 24 of the blade 14 to cut a work piece using the cutting teeth of the bottom edge 16 of the blade 14. In one construction, the handle members 42, 44 are formed from nylon 6, and in other constructions, the handle members 42, 44 may be formed from other suitable materials, such as ABS.

Figure 4:
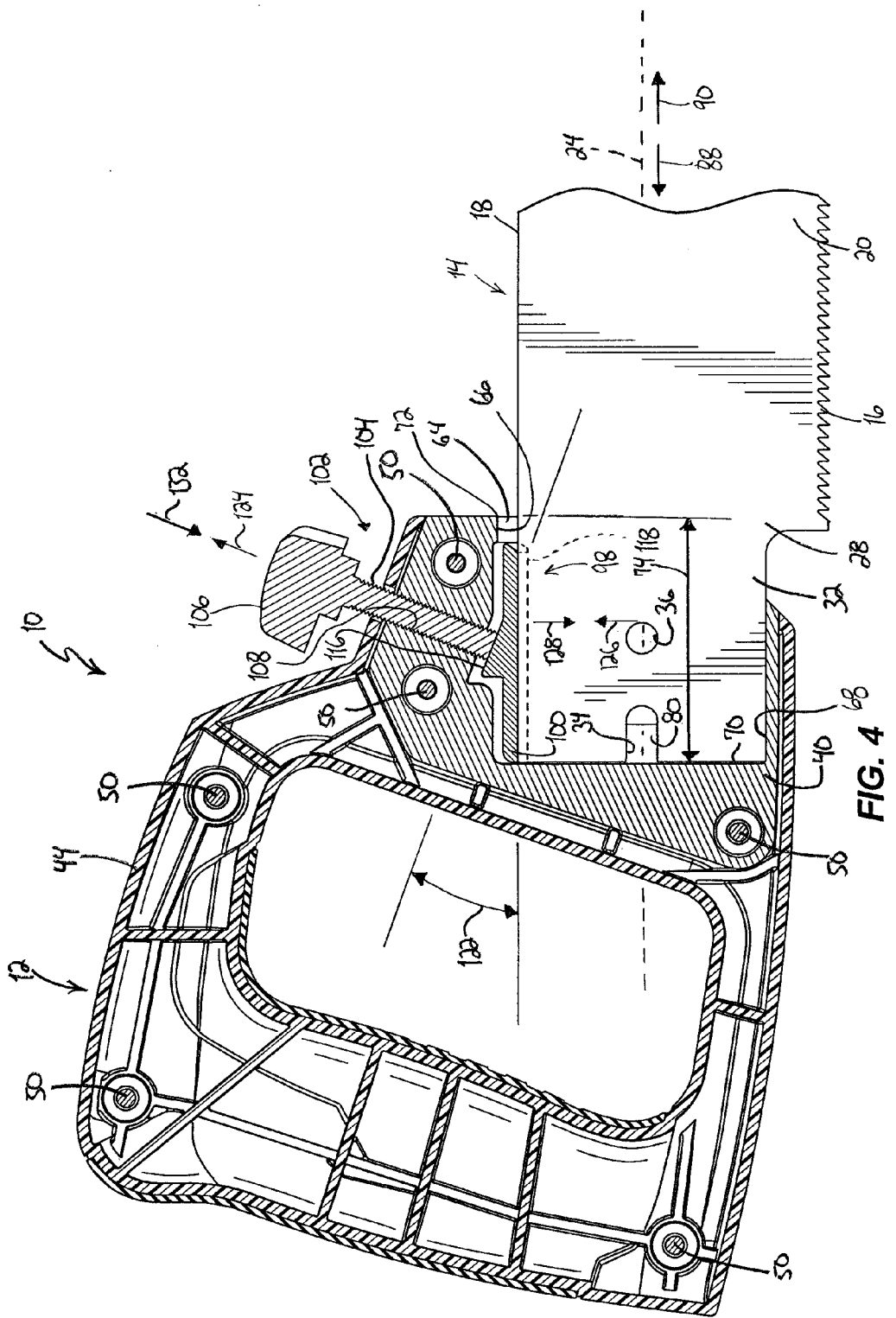
FIG. 4 is a side view of the hand saw of FIG. 1 with the handle member removed.
Figure 5:
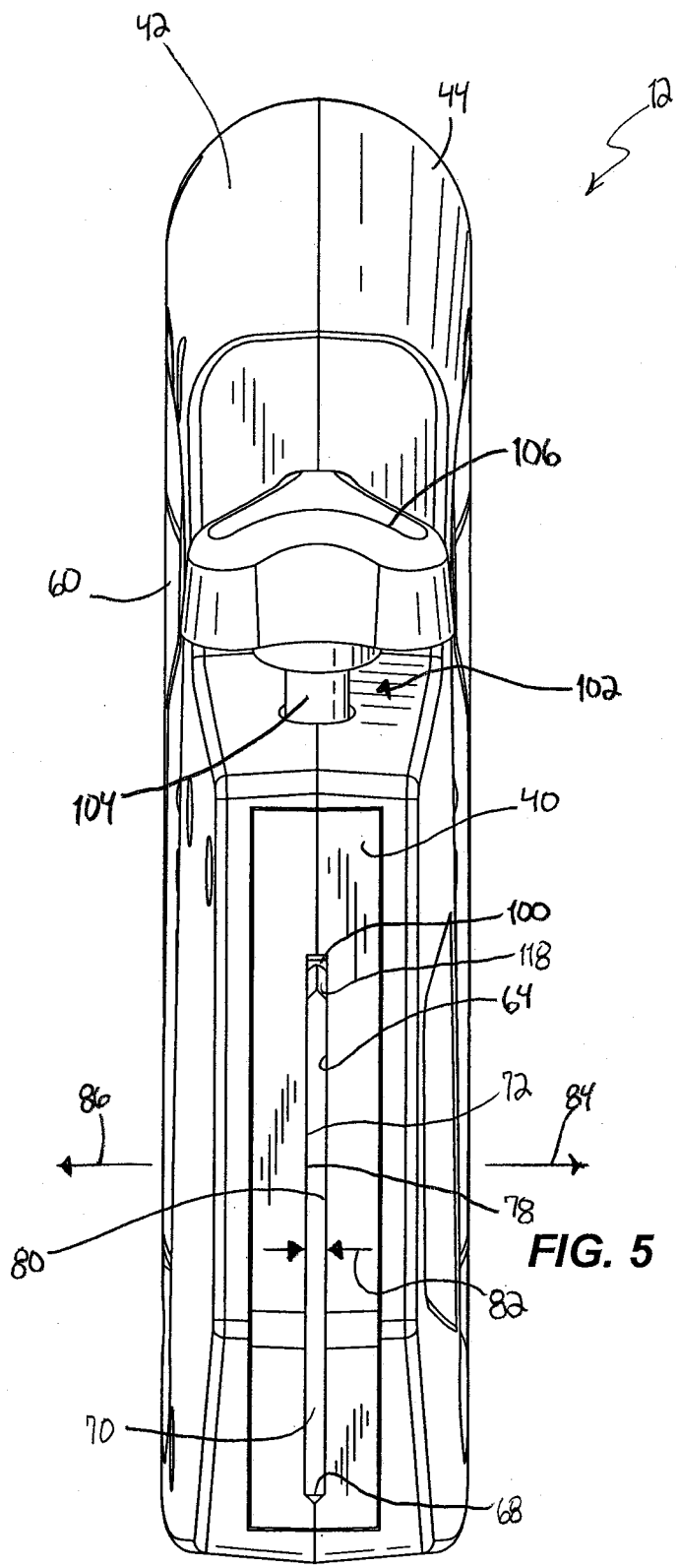
FIG. 5 is an end view of the hand saw of FIG. 1 with a blade of the hand saw removed.

Referring to FIGS. 2 and 4, the main body 40 includes a blade receiving slot 64 having an upper wall 66, a lower wall 68 opposite the upper wall 66, an inner wall 70 that forms a closed end of the slot 64, and an open end 72 opposite the inner wall 70. A length 74 of the blade receiving slot 64 is defined as a distance from the inner wall 70 to the open end 72. Referring to FIG. 5, the slot 64 is further defined by a first interior wall 78 of the main body 40 and a second interior wall 80 of the main body 40 that is parallel to and faces the first interior wall 78. When the saw blade 14 is received in the slot 64 (FIG. 4), the first interior wall 78 faces the first sidewall 20 of the blade 14 and the second interior wall 80 faces the second sidewall 22 of the blade 14. A width 82 of the blade receiving slot 64 is defined as the distance between the interior walls 78, 80 and the width 82 is slightly wider than the thickness 25 of the blade 14 to allow the blade 14 to be received within the slot 64. However, the width 82 of the slot 64 also minimizes movement of the blade 14 in the directions of arrows 84 and 86 that are normal to the longitudinal axis 24 (FIG. 2) of the blade 14. Also, as best seen in FIGS. 2 and 5, the interior walls 78, 80 are flat and therefore the walls 78, 80 do not include any projections or the like that extend into the slot 64 to inhibit movement of the blade 14 into or out of the slot 64 (i.e., in the directions of arrows 88 and 90 along the longitudinal axis 24 of the blade 14).

Referring to FIG. 2, the main body 40 further includes apertures 94 that extend through the main body 40. Each of the apertures 94 receives one of the posts 54 of the second handle member 44 to position the main body 40 with respect to the handle members 42, 44. In one construction, the main body 40 is integrally formed as a single component from diecast A380 aluminum. Accordingly, in one construction, the main body 40, which primarily provides support for the blade 14, is made from aluminum, a relatively strong material, and the handle members 42, 44 are made from ABS, which is relatively lightweight and low cost, but generally does not have the same strength as aluminum. In other constructions, the main body 40 may be formed from any suitable material using any suitable method.

Referring to FIGS. 2 and 3, the handle assembly 12 further includes a blade clamp assembly 98 that is supported by the main body 40. The blade clamp assembly 90 includes a clamp member 100 and an actuator 102. The illustrated actuator 102 includes a threaded shank 104 and a thumb turn 106 coupled to the shank 104 in order to allow a user to rotate the shank 104. The threaded shank 104 is received in a threaded aperture 108 of the main body 40. The clamp member 100 is received in a recess 112 of the main body 40 to position the clamp member 100 with respect to the blade 14, and more particularly, with respect to the top edge 18 of the blade 14. The clamp member 100 includes an angled upper surface 116 and a V-shaped groove 118 that is formed on a lower surface of the clamp member 100. The V-shaped groove 118 is sized to receive the blade 14, and in particular, the top edge 18 of blade 14. Referring to FIG. 4, the angled upper surface 116 forms an acute angle 122 measured between the surface 116 and the top edge 18 of the blade 14 as illustrated in FIG. 4. In the illustrated construction, the angle 122 is about 20 degrees.

Referring to FIG. 4, in operation, the user couples the blade 14 to the handle assembly 12 by placing the blade clamp member 100 in a released position. The user places the clamp member 100 in the released position by rotating the threaded shank 104 using the thumb turn 106 (counterclockwise in the illustration FIG. 1) to move the shank 104 in a direction out of the threaded aperture 108 (i.e., in a direction of arrow 124) thereby releasing any clamping force on the clamp member 100 by the shank 104. In the released position, the clamp member 100 is able to move slightly in the vertical directions (i.e., the directions of arrows 126 and 128). Therefore, the user can slide the tang 32 of the blade 14 in the direction of arrow 88 and into the blade receiving slot 64 until the blade 14 contacts the inner wall 70 of the slot 64, which is the position illustrated in FIG. 4. As discussed above, the interior walls 78, 80 (FIG. 5) of the slot 64 are flat and therefore, the walls 78, 80 do not include any projections or the like that extend into the slot 64 to inhibit movement of the blade 14 into the slot 64. Thus, the user can insert the blade 14 into the slot 64 without moving the blade 14 in directions normal to the longitudinal axis 24 of the blade 14 (i.e., directions of arrows 84 and 86 of FIG. 3).

With the blade 14 in the position illustrated in FIG. 4, the user rotates the thumb turn 106 to place the blade clamp member 100 in a clamped position (position illustrated in FIG. 4). The user rotates the thumb turn 106 (clockwise in the illustration of FIG. 1) to move the threaded shank 104 further into the threaded aperture 108 of the main body 40 or in the direction of arrow 132 of FIG. 4 in order apply a clamping force to the clamp member 100. In the illustrated construction, the threaded shank 104 directly contacts the angled surface 116 of the clamp member 100 to apply the clamping force, and the clamp member 100 directly contacts the top edge 18 of the blade 14 to apply the clamping force to the top edge 18 of the blade 14 at the tang 32. Applying force to the clamp member 100 forces the blade 14 against the lower wall 68 of the slot 64 to tightly retain the tang 32 of the blade 14 between the clamp member 100 and the lower wall 68 of the slot 64. Then, the user may utilize the saw 10 to cut any suitable material. In the illustrated construction, the clamp member 100 includes the angled upper surface 116 at the angle 122 with respect to the top edge 18 of the blade 14 and the shank 104 contacts the angled surface 116. Therefore, a portion of the clamping force is directed along the longitudinal axis 24 of the blade 14 in a direction toward the inner wall 70 of the slot 64 (i.e., in the direction the arrow 88) and a portion of the clamping force is directed toward the lower wall 68 of the slot 64 (i.e., in the direction of the arrow 128).

If the user desires to change the blade 14, the user places the blade clamp member 100 back in the released position as discussed above by rotating the threaded shank 104 using the thumb turn 106 to release the clamping force applied by the clamp member 100 to the blade 14. In the released position, the user may slide the tang 32 of the blade 14 out of the blade receiving slot 64. As discussed above, the interior walls 78, 80 (FIG. 5) of the slot 64 are flat. Therefore, the walls 78, 80 do not include any projections or the like that extend into the slot 64 or the blade 14 when the blade 14 is received in the slot 64 to inhibit movement of the blade 14 out of the slot 64 when the clamp member 100 is in the released position and the user can remove the blade 14 from the slot 64 without moving the blade 14 in directions normal to the longitudinal axis 24 of the blade 14 (i.e., directions of arrows 84, 86). Furthermore, the clamping force is only applied to the top edge 18 of the blade 14 by the clamp member 100. Therefore, no portion of the saw 10 or handle assembly 12, including the blade clamp assembly 98, extends into the blade 14 to inhibit movement of the blade 14 out of the slot 64 when the clamp member 100 is in the released position. The user only needs to move the saw blade 14 along the longitudinal axis 24 of the saw blade 14 in the direction of arrow 90 to remove the tang 32 from the slot 64. The user does not need to move the blade 14 in directions normal to the longitudinal axis 24 of the blade 14 (i.e., the directions of arrows 84, 86). In addition, no portion of the blade clamp assembly 98 extends into the saw blade 14, including the apertures 34 and 36, and therefore, the user does not need to align the blade clamp assembly 98 with an aperture of the blade 14 to couple the blade 14 to the handle assembly 12. The user can couple the blade 14 to the handle assembly 12 without utilizing the apertures 34 and 36 of the blade 14.

Figure 6:
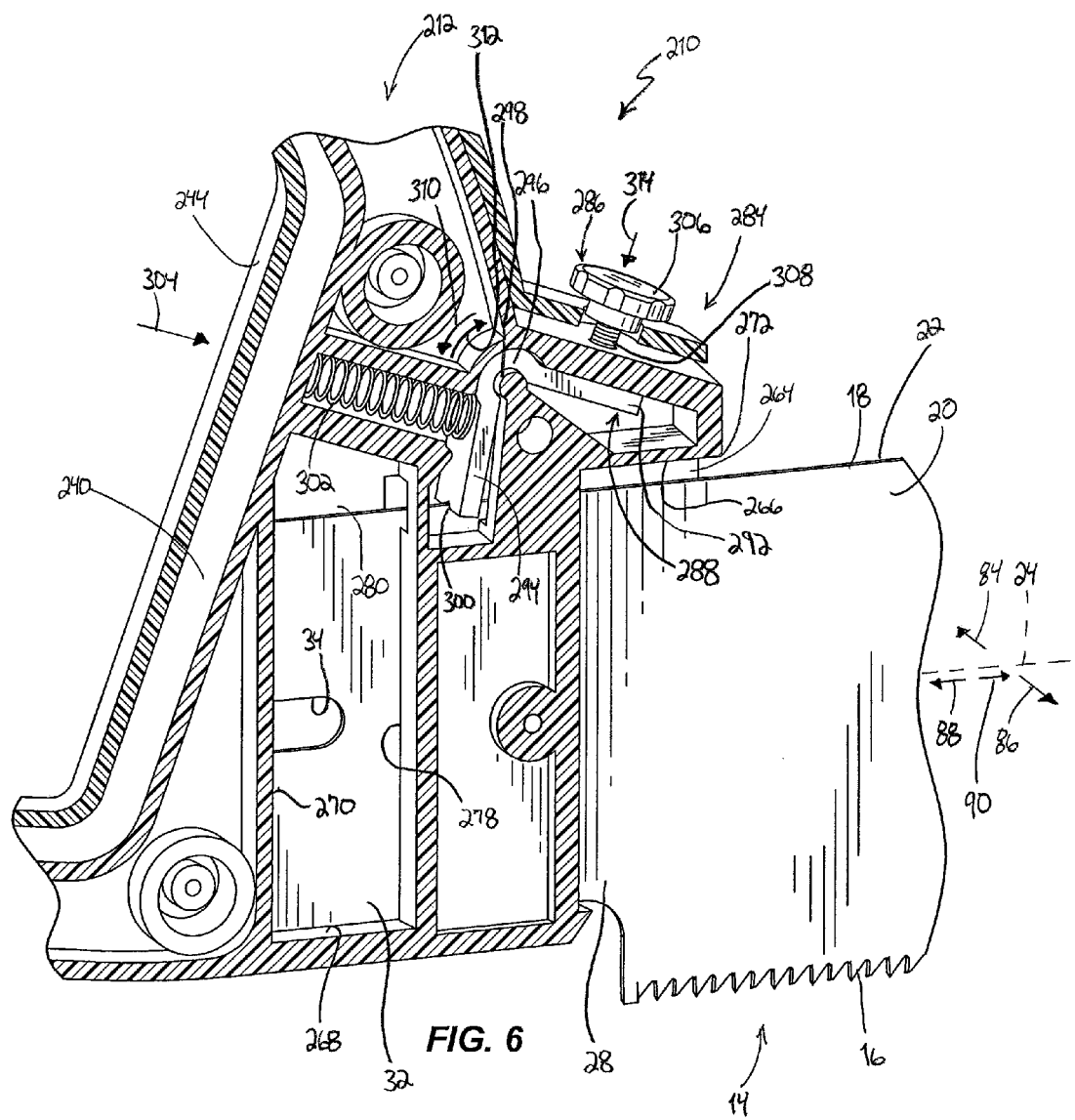
FIG. 6 is a partial perspective view of a hand saw according to another construction of the invention with a handle member removed.

FIG. 6 illustrates a saw 210 according to another construction of the invention. The illustrated saw 210 includes the blade 14 that is the same as the blade 14 illustrated in FIGS. 1-5 and described above. The saw 210 also includes other similar features as the saw 10 illustrated in FIGS. 1-5 and described above. Therefore, only differences between the saws 210 and 10 will be discussed below.

The saw 210 includes a handle assembly 212 to which the blade 14 is coupled. The handle assembly 212 includes a main body 240, a first handle member (not illustrated), and a second handle member 244. In the illustrated construction, the first handle member and the second handle member 244 each form half of an outer cover or shell around the main body 240, and the main body 240 is located within or between the first handle member and the second handle member 244.

The main body 240 includes a blade receiving slot 264 having an upper wall 266, a lower wall 268 opposite the upper wall 266, an inner wall 270 that forms a closed end of the slot 264, and an open end 272 opposite the inner wall 270. The slot 264 is further defined by a first interior wall 278 of the main body 240 and a second interior wall 280 of the main body 240 that is parallel to and faces the first interior wall 278. Like the main body 40 of the saw 10 of FIGS. 1-5, the interior walls 278, 280 are flat and therefore, the walls 278, 280 do not include any projections or the like that extend into the slot 264 to inhibit movement of the blade 14 into or out of the slot 264 (i.e., in the directions of arrows 88, 90 along the longitudinal axis 24 of the blade 14).

The saw 210 further includes a blade clamp assembly 284. The blade clamp assembly 284 includes an actuator 286 and a clamp member 288. The clamp member 288 includes a first leg 292 and a second leg 294. The legs 292, 294 are connected by an arcuate transition 296 that defines a portion of a cylinder. The transition 296 receives a partially cylindrically-shaped post or pivot 298 of the main body 240 such that the clamp member 288 pivots on the post 298 with respect to the main body 240. The second leg 294 of the clamp member 288 includes a V-shaped groove 300 formed at a free end of the leg 294. A biasing member 302, which is a coil spring in the illustrated construction, contacts the main body 240 and the second leg 294 to bias the clamp member 288 about the post 298 in the direction of arrow 304 (counterclockwise as illustrated in FIG. 6) and toward a clamped position. The actuator 286 includes a push button 306 and a shank 308 that engages the clamp member 288 to interconnect the push button 306 and the clamp member 288.

In operation, the user couples the blade 14 to the handle assembly 212 by sliding or inserting the blade 14 into the blade receiving slot 264 until the blade 14 contacts the inner wall 270 of the slot 264, which is the position illustrated in FIG. 6. As the blade 14 is being inserted into the slot 264 (direction of arrow 88), the blade 14 contacts the second leg 294 of the clamp member 288 to pivot the clamp member 288 about the post 298 in the direction of arrow 312 against the bias of the spring 302, thereby pivoting the clamp member 288 from the clamped position to a released position. Accordingly, the user may couple the blade 14 to the handle assembly 212 without directly operating the actuator 286 (i.e., pressing the push button 306 in the illustrated construction). With the blade 14 in the position illustrated in FIG. 6, the spring 302 biases the clamp member 288 into the clamped position and into direct contact with the upper edge 18 of the blade 14 and the upper edge 18 of the blade 14 is received within the groove 300 of the clamp member 288. Together, the spring 302 and the clamp member 288 hold the blade 14 firmly against the lower wall 268 of the slot 264 such that the user can utilize the saw 210 to cut any suitable material. With the blade 14 and the clamp assembly 284 in the positions illustrated in FIG. 6, a force along the longitudinal axis 24 of the saw blade 14 in the direction of arrow 90 (i.e., in a direction that tends to remove the tang 32 from the slot 264) causes the clamp member 288 to pivot about the post 298 toward the clamped position (i.e., in the direction of arrow 310). Accordingly, the force tending to remove the tang 32 from the slot 264 increases the clamping force on the blade 14 by the clamp member 288.

If the user desires to change the blade 14, the user pushes the push button 306 to move the clamp member 288 to the released position. To place the clamp member 288 in the released position, the user pushes the button 306 in the direction of arrow 314, which causes the shank 308 of the actuator 286 to contact and pivot the clamp member 288 in the direction of arrow 312 and out of engagement with the top edge 18 of the saw blade 14. Therefore, the clamp member 288 no longer holds the blade 14 against the lower wall 268 of the slot 264. In the released position, the user may slide the blade 14 out of the blade receiving slot 264 by pulling the blade 14 in the direction of arrow 90 along the longitudinal axis 24 of the blade 14.

Similar to the saw 10 of FIGS. 1-5, described above, the user may couple the blade 14 to the handle assembly 212 without utilizing the apertures 34, 36 (FIG. 2) of the blade 14. Furthermore, no portion of the saw 210 or handle assembly 212, including the blade clamp assembly 284, extends into the blade 14 to inhibit movement of the blade 14 out of the slot 264 when the clamp member 288 is in the released position. The user does not need to move the blade 14 in directions normal to the longitudinal axis 24 of the blade 14 (i.e., the directions of arrows 84, 86) to remove the blade 14 from the slot 264 or to insert the blade 14 into the slot 264. In addition, no portion of the blade clamp assembly 284 extends into the saw blade 14, including the apertures 34 and 36, and therefore, the user does not need to align the blade clamp assembly 284 with an aperture of the blade 14 to couple the blade 14 to the handle assembly 212.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A hand saw comprising:
a saw blade including a top edge, a bottom edge having a plurality of cutting teeth, a first sidewall that extends between the top edge and the bottom edge, a second sidewall that extends between the top edge and the bottom edge opposite and generally parallel to the first sidewall, a longitudinal axis between the first sidewall and the second sidewall of the saw blade parallel to the first sidewall and the second sidewall, and a tang located at an end of the saw blade, the tang at least partially formed by the first sidewall and the second sidewall; and
a handle assembly including a slot that receives the tang to couple the saw blade to the handle assembly, the handle assembly further including a handle portion configured to be grasped by a user to reciprocate the saw blade to cut a work piece, a clamp member that pivots between a clamped position and a released position, and an actuator that is manually operable between a first position and a second position to move the clamp member from the clamped position to the released position,
wherein in the clamped position the clamp member exerts a clamping force on the tang to inhibit removal of the tang from the slot,
wherein in the released position the tang can be removed from the slot by pulling the saw blade out of the slot,
wherein insertion of the saw blade into the slot causes the saw blade to contact the clamp member to pivot the clamp member toward the released position allowing a user to insert the saw blade into the slot without the user directly operating the actuator, and
wherein when the actuator is in the first position, the tang is positioned within the slot, and the clamp member is in the clamped position, a force along the longitudinal axis of the saw blade in a direction to remove the tang from the slot causes the clamp member to pivot toward the clamped position to increase the clamping force.

2. The hand saw of claim 1, wherein the actuator includes a push button and a shank that engages the clamp member, wherein the push button is manually operable to move the shank to pivot the clamp member to the released position.

3. The hand saw of claim 1, wherein the slot is at least partially defined by a first interior wall of the handle assembly that is parallel to and faces the first sidewall of the saw blade when the tang is received in the slot and a second interior wall of the handle assembly that is parallel to and faces the second sidewall of the saw blade when the tang is received in the slot, and wherein the first interior wall and the second interior wall of the handle assembly are flat such that the tang can be removed from the slot without moving the saw blade in a direction normal to the longitudinal axis of the saw blade when the clamp member is in the released position.

4. The hand saw of claim 1, wherein when the clamp member is in the clamped position and the released position, no portion of the handle assembly extends through the tang from the first sidewall to the second sidewall between the top edge and the bottom edge of the saw blade to inhibit removal of the tang from the slot of the handle assembly.

5. The hand saw of claim 1, wherein the clamp member includes a V-shaped groove that receives the top edge of the saw blade when the saw blade is received in the slot.

6. The hand saw of claim 1, wherein the handle assembly includes a main body that defines the slot, a first handle member, and a second handle member that is coupled to the first handle member to enclose the main body within the handle assembly, and wherein the first handle member and the second handle member together define the handle portion of the hand saw.

7. The hand saw of claim 6, wherein the main body is integrally formed as a single component.

8. The hand saw of claim 6, wherein the main body includes an aperture, wherein the second handle member includes a post that extends into the aperture to couple the main body to the second handle member, wherein the post includes a threaded aperture, wherein a fastener extends through the first handle member and into the threaded aperture of the post to couple the first handle member, the second handle member, and the main body.

9. The hand saw of claim 6, wherein the main body is formed from a first material, and wherein the first handle member and the second handle member are formed from a second material.

10. The hand saw of claim 1, wherein the clamp member includes a first leg and a second leg coupled by an arcuate transition therebetween, the transition pivotable about a post to pivot the clamp member between the clamped position and the released position.

11. The hand saw of claim 1, wherein the slot includes a substantially flat lower wall and the blade is moved along the substantially flat lower wall to insert and remove the saw blade from the handle assembly.

12. A hand saw comprising:
a saw blade including a top edge, a bottom edge having a plurality of cutting teeth, a first sidewall that extends between the top edge and the bottom edge, a second sidewall that extends between the top edge and the bottom edge opposite and generally parallel to the first sidewall, a longitudinal axis between the first sidewall and the second sidewall of the saw blade parallel to the first sidewall and the second sidewall, and a tang located at an end of the saw blade, the tang at least partially formed by the first sidewall and the second sidewall; and
a handle assembly including,
a slot that receives the tang to couple the saw blade to the handle assembly, the slot at least partially defined by a first interior wall of the handle assembly that is parallel to and faces the portion of the first sidewall of the saw blade when the tang is received in the slot and a second interior wall of the handle assembly that is parallel to and faces the portion of the second sidewall of the saw blade when the tang is received in the slot, the slot including an open end through which the tang is received and a closed end opposite the open end,
a handle portion configured to be grasped by a user to reciprocate the saw blade to cut a work piece,
a clamp member including a first leg and a second leg, the clamp member pivotable between a clamped position and a released position,
a clamp actuator that is manually operable between a first position and a second position to move the clamp member from the clamped position to the released position,
wherein in the clamped position the clamp member exerts the clamping force on the top edge of the saw blade within the slot to couple the saw blade to the handle assembly and to retain the tang within the slot,
wherein in the released position the tang is removable from the slot,
wherein the first interior wall and the second interior wall of the handle assembly are flat such that the tang of the saw blade can be removed from the slot without moving the saw blade in a direction normal to the longitudinal axis of the saw blade when the clamp member is in the released position; and
wherein the clamp member includes a V-shaped groove that receives the top edge of the saw blade when the saw blade is received in the slot.

13. The hand saw of claim 12, wherein the first and second legs of the clamp member are coupled by an arcuate transition, the transition pivotable about a post to pivot the clamp member between the clamped position and the released position.

14. The hand saw of claim 12, wherein the actuator includes a push button and a shank that engages the clamp member, wherein the push button is manually operable to move the shank to pivot the clamp member to the released position.

15. The hand saw of claim 12, wherein when the clamp member is in the clamped position and the released position, no portion of the handle assembly extends through the tang from the first sidewall to the second sidewall between the top edge and the bottom edge of the saw blade to inhibit removal of the tang from the slot of the handle assembly.

16. A hand saw comprising:
a saw blade including a top edge, a bottom edge having a plurality of cutting teeth, a first sidewall that extends between the top edge and the bottom edge, a second sidewall that extends between the top edge and the bottom edge opposite and generally parallel to the first sidewall, a longitudinal axis between the first sidewall and the second sidewall of the saw blade parallel to the first sidewall and the second sidewall, and a tang located at an end of the saw blade, the tang at least partially formed by the first sidewall and the second sidewall; and
a handle assembly including a slot that receives the tang to couple the saw blade to the handle assembly, the handle assembly further including a handle portion configured to be grasped by a user to reciprocate the saw blade to cut a work piece,
a pivotable clamp member,
a clamp actuator that is manually operable between a first position and a second position to pivot the clamp member,
wherein insertion of the saw blade into the slot causes the saw blade pivot the clamp member in a first direction thereby allowing a user to insert the saw blade into the slot without the user directly operating the actuator,
wherein when the actuator is in the first position, the tang is positioned within the slot such that the clamp member exerts a clamping force on the tang thereby securing the tang within the slot, and
wherein a force along the longitudinal axis of the saw blade in a direction opposite insertion of the saw blade into the slot causes the clamp member to pivot in a second direction thereby increasing the clamping force.

17. The hand saw of claim 16, wherein the actuator includes a push button and a shank that engages the clamp member, wherein the push button is manually operable to move the shank to pivot the clamp member in the first direction thereby allowing the user to remove the saw blade from the slot.

18. The hand saw of claim 16, wherein the slot is at least partially defined by a first interior wall of the handle assembly that is parallel to and faces the first sidewall of the saw blade when the tang is received in the slot and a second interior wall of the handle assembly that is parallel to and faces the second sidewall of the saw blade when the tang is received in the slot, and wherein the first interior wall and the second interior wall of the handle assembly are flat such that the tang can be removed from the slot without moving the saw blade in a direction normal to the longitudinal axis of the saw blade when the clamp member is in the released position.

19. The hand saw of claim 16, wherein no portion of the handle assembly extends through the tang from the first sidewall to the second sidewall between the top edge and the bottom edge of the saw blade to inhibit removal of the tang from the slot of the handle assembly.

20. The hand saw of claim 16, wherein the clamp member includes a first leg and a second leg coupled by an arcuate transition therebetween, the transition pivotable about a post relative to the slot.

21. The hand saw of claim 16, wherein the slot includes a substantially flat lower wall and the blade is moved along the substantially flat lower wall to insert and remove the saw blade from the handle assembly.

\* \* \* \* \*